(12) United States Patent
Whitener et al.

(10) Patent No.: US 6,424,063 B1
(45) Date of Patent: Jul. 23, 2002

(54) GENERATOR ROTOR LEAD PATH CONFIGURATION

(75) Inventors: Randy Edward Whitener, Oviedo; Kevin Michael Light, Maitland; Jiping Zhang, Winter Springs; Robert Lawrence Murphy, Longwood, all of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 13 days.

(21) Appl. No.: 09/678,133

(22) Filed: Oct. 4, 2000

(51) Int. Cl.[7] .............................................. H02K 11/00
(52) U.S. Cl. ...................... 310/71; 310/262; 310/270; 248/74.5
(58) Field of Search .......................... 310/71, 61, 261, 310/262, 270; 248/65, 73, 74.5

(56) References Cited

U.S. PATENT DOCUMENTS

| | | | |
|---|---|---|---|
| 931,606 A | * 9/1909 | Hirt | 310/71 |
| 3,916,230 A | * 10/1975 | Albaric et al. | 310/61 |
| 4,074,155 A | 2/1978 | Haditsch et al. | 310/71 |
| 4,091,299 A | 5/1978 | Vichenko et al. | 310/71 |
| 4,155,019 A | 5/1979 | Weghaupt | 310/61 |
| 4,712,029 A | 12/1987 | Nold | 310/71 |
| 4,870,308 A | 9/1989 | Sismour | 310/71 |
| 5,122,696 A | 6/1992 | Shih et al. | 310/71 |
| 5,184,792 A | * 2/1993 | Bernhard et al. | 248/71 |
| 5,241,231 A | 8/1993 | Haditsch et al. | 310/71 |
| 5,300,847 A | 4/1994 | Haditsch | 310/61 |
| 5,777,408 A | 7/1998 | Brem | 310/71 |

* cited by examiner

Primary Examiner—Karl Tamai

(57) ABSTRACT

A generator rotor lead path configuration includes a plurality of electrically conductive components attached to each other. These components may include a cleat and a wedge. The improved lead path inhibits, if not prevents, lead path failure. A method of assembling or fitting the lead path into a generator is also provided, as well as a method of replacing or retrofitting a lead path that is susceptible to failure with the improved lead path configuration. Assistance in determining causes of lead path failure and ways to overcome lead path failure are also provided.

15 Claims, 6 Drawing Sheets

GENERATOR ROTOR LEAD PATH CONFIGURATION

FIELD OF THE INVENTION

The present invention relates in general to a lead path configuration for an electric device and, more particularly, to an improved lead path configuration for a generator rotor used in a power generation plant.

BACKGROUND OF THE INVENTION

Many power generation plants produce electricity by converting energy (e.g. fossil fuel, nuclear fusion, hydraulic head and geothermal heat) into mechanical energy (e.g. rotation of a turbine shaft), and then converting the mechanical energy into electrical energy (e.g. by the principles of electromagnetic induction).

Some of these power generation plants, such as a fossil-fuel power generation plant, comprise a turbine, a generator and an exciter. The turbine, generator and exciter are typically coupled to each other in axial alignment, with the generator located between the turbine and the exciter.

The turbine converts fossil fuel energy into mechanical energy in the form of turbine shaft rotation through a steam or combustion cycle. The generator then converts the rotational energy into electrical energy. The generator includes an axially extending rotor journaled in an annular stator that surrounds and sleeves the rotor. The rotor has a shaft in which conductive coil windings are axially arranged. The stator has punchings that collectively from an annular core in which conductive coil windings are positioned parallel with respect to the axial rotor coils. As the turbine shaft rotates the generator rotor, the exciter provides an electrical current to the rotor coil windings. The rotating electrically charged rotor creates a magnetic flux that induces an electrical current in the stationary stator coil windings. This induced electrical current is then drawn from the stator and constitutes the electricity that the power generation plant provides to electricity consumers.

One aspect of the above-described power generation scheme involves the electrical interconnection of the exciter and generator. An electrically conductive lead path is used to transport current in a closed loop configuration from the exciter, through the generator rotor coil windings, and then back to the exciter. It has been observed that, as a result of prolonged generator use, the lead path can physically sever or otherwise fail to properly carry current. Among other things, lead path failure can cause electric arcing or re-routing of the electric current through nearby conductive materials. Arcing and re-routing can, among other things, melt portions of the generator shaft and otherwise damage the generator.

It has also been observed that some portions of the lead path tend to fail more often than other portions of the lead path. In particular, it has been observed that lead path failure tends to occur along a portion of the lead path around area A shown in FIG. 2.

There is thus a need for a lead path that inhibits, if not prevents, lead path failure. There is also a need for a portion of a lead path that is particularly suited to inhibit, if not prevent, lead path failure path around area A shown in FIG. 2. There is further need for a lead path that improves upon the prior art.

SUMMARY OF THE INVENTION

The present invention provides a lead path that inhibits, if not prevents, lead path failure, especially around area A shown in FIG. 2. The present invention also provides a method of assembling or fitting the lead path of the present invention into a generator. The present invention further provides a method of repairing or retrofitting a lead path that has failed or is susceptible to failure with the lead path of the present invention. The present invention also recognizes that causes of lead path failure around area A shown in FIG. 2 are relatively unknown. Thus, the present invention also provides assistance in determining causes of lead path failure and identifies ways to overcome lead path failure.

One aspect of the present invention thus involves an apparatus adapted to form a conductive path for carrying an electric current in a generator having a shaft. The apparatus comprises an electrically conductive strap having a first end and a second end, and forming at least a portion of the conductive path. The apparatus also comprises a cleat having at least one axially extending spigot, the cleat adapted to retain the strap between the cleat and a portion of the shaft, the spigot sized and configured to carry at least a portion of a radial load of the strap and at least a portion of an axial load of the strap.

Another aspect of the present invention thus involves a method of retrofitting an electrical lead path in a generator. The method comprises removing a portion of a shaft of the generator to form at least one slot. The method also comprises arranging a conductive portion of the lead path between the shaft and a cleat, the cleat having a general T-shape with a portion that is sized and configured for placement within the at least one slot. The method also comprises attaching the cleat to the rotor so that the cleat can accept at least a portion of a radial load exerted by the strap and at least a portion of an axial load exerted by the strap. Yet another aspect of the present invention thus involves a method of choosing a plurality of electrically conductive components to inhibit electrical failure in a lead path of a generator. The method comprises identifying at least one phenomenon that may cause or tend to cause lead path failure. The method also comprises providing a plurality of components adapted to inhibit the identified at least one phenomenon from causing or tending to cause lead path failure, the plurality of components including a cleat component having at least one tapered spigot and adapted to secure a portion of the lead path and accept stress and load forces from the lead path during normal generator operation. The method also comprises arranging and attaching at least one electrically conductive component to form the lead path.

Further aspects, features and advantages of the present invention will become apparent from the drawings and detailed description of the preferred embodiment that follows.

BRIEF DESCRIPTION OF THE DRAWINGS

The above-mentioned and other concepts of the present invention will now be addressed with reference to the drawings of the preferred embodiment of the present invention. The illustrated embodiment is intended to illustrate, but not to limit the invention. The drawings contain the following figures, in which like numbers refer to like parts throughout the description and drawings and wherein.

DETAILED DESCRIPTION OF THE PREFERRED EMBODIMENT

The generator rotor lead path configuration described herein employs several basic concepts. For example, one concept relates to a lead path that inhibits, if not prevents, failure during the lifetime of a generator that experiences normal use and routine maintenance. Another concept relates to a method of configuring and assembling a plurality of conductive components to form a lead path. Yet another concept relates to a method of retrofitting an existing generator to provide the generator with the lead path of the present invention.

The present embodiment of the invention is disclosed in context of use with a generator, for example, one having a similar design as a 2 pole hydrogen cooled, direct cooled rotor, with watercooled stator windings ("THDF") generator that has been sold by the Siemens Corporation. The principles of the present invention, however, are not limited to THDF type generators. Instead, it will be understood by one skilled in the art, in light of the present disclosure, that the present invention disclosed herein can be successfully utilized in connection with other types of generators. One skilled in the art may also find additional applications for the lead path, components thereof, and methods disclosed herein, such as with other dynamoelectric machines, motors, wirings and apparatuses that use a conductive path. Thus, the illustration and description of the lead path of the present invention in connection with an exemplary generator is merely one possible application of the lead path of the present invention.

To assist in the description of the invention described herein, the following terms are used. "Inboard" and "outboard" are used to describe relative location, with "inboard" describing a location that is closer to the physical center of the generator rotor length than a location that is "outboard." Thus, a component that has an "inboard end" and an "outboard end" can be understood to be arranged such that one end is closer to the physical center of the generator rotor length than the other end.

Figure 1:
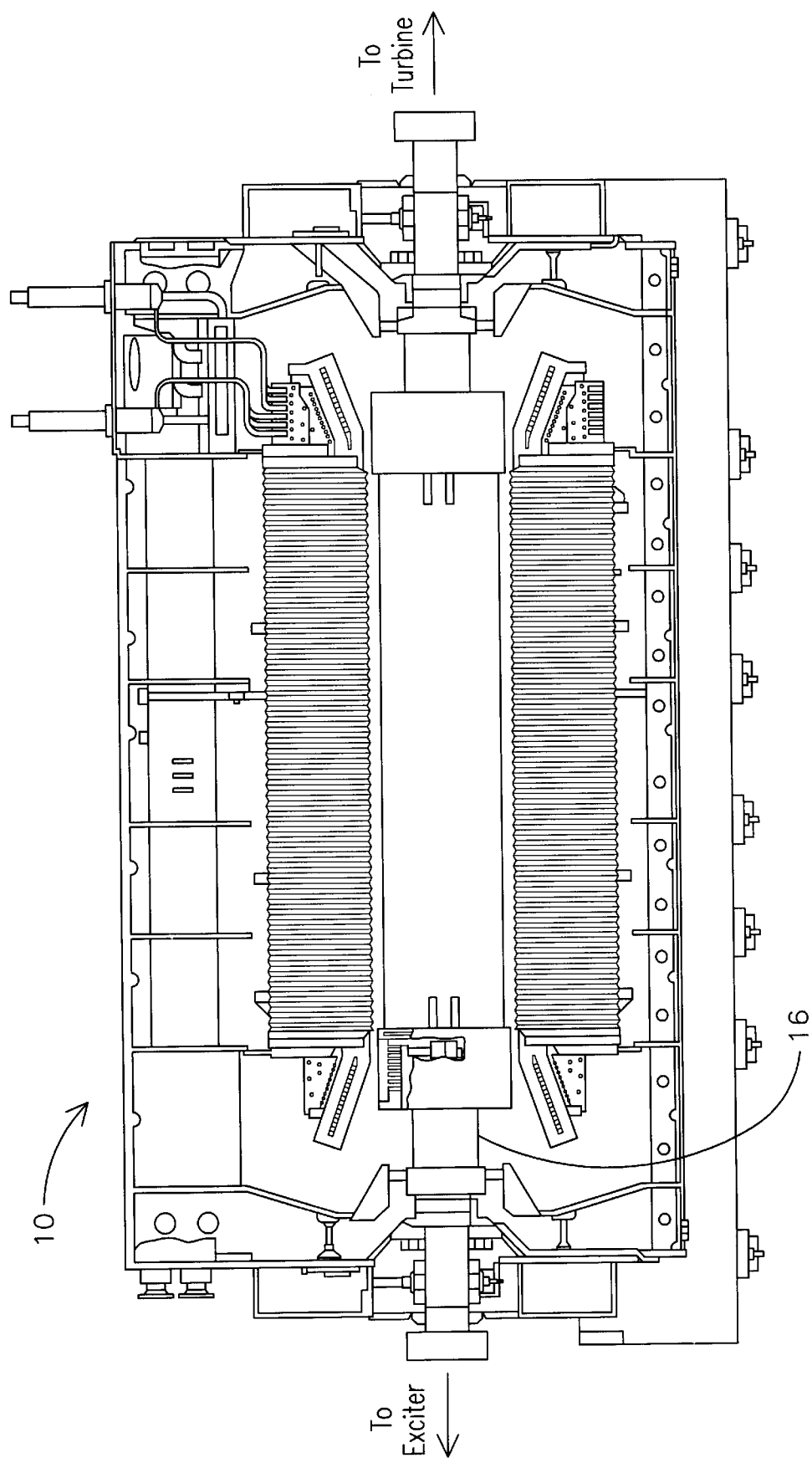
FIG. 1 is a cutaway side elevation view of a generator in accordance with the present invention.
Figure 2:
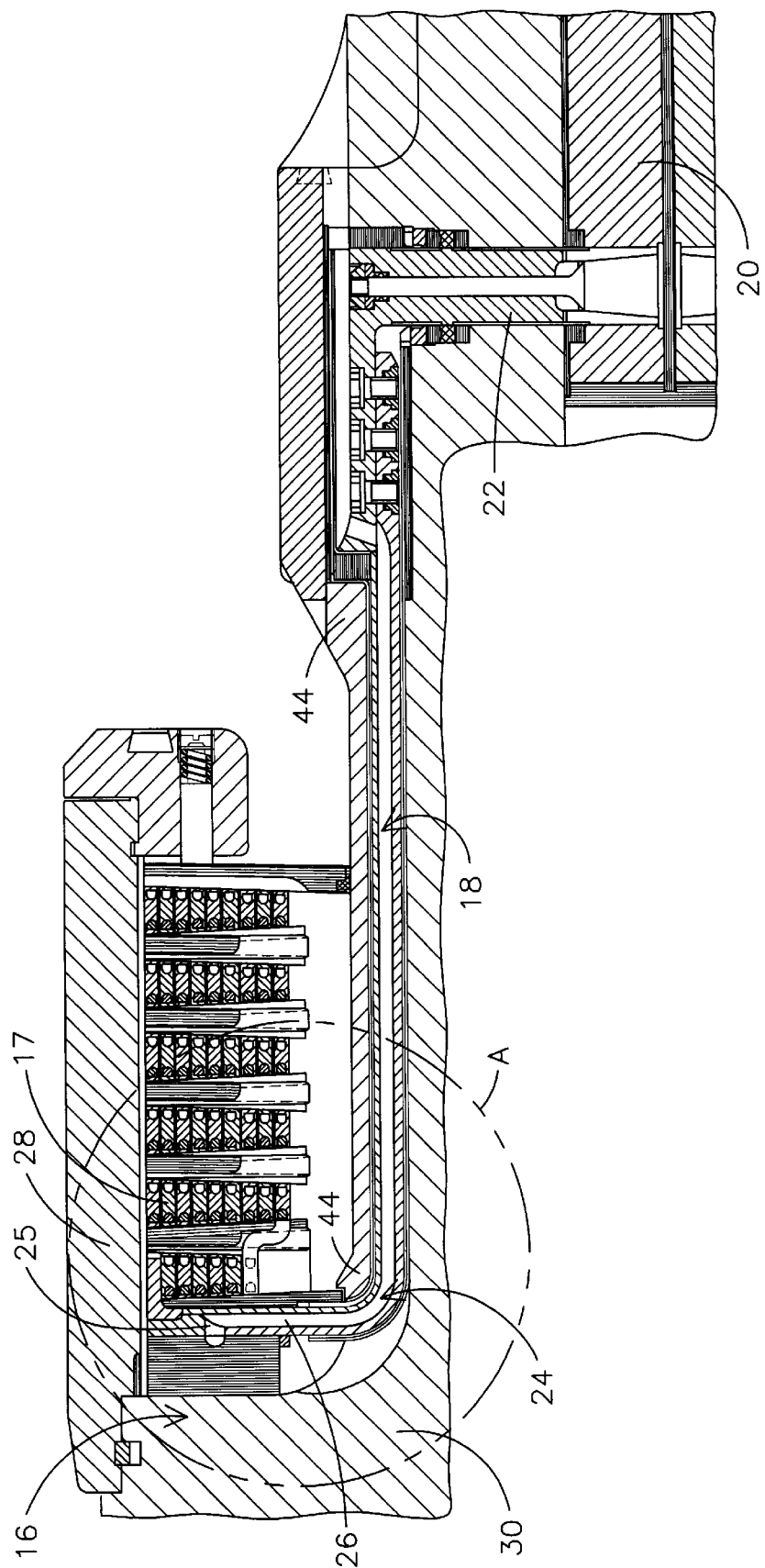
FIG. 2 is a cutaway side elevation view of a lead path that transports current from the exciter, through the generator rotor coil windings, and then back to the exciter.

An overview of an exemplary existing generator and generator lead path is provided, followed by a more detailed explanation of the lead path of the present invention, to include various component parts and methods of use. Referring to FIGS. 1 and 2, a generator 10 is coupled in axial alignment between a turbine (not shown) and an exciter (not shown). The exciter provides an electrical current to the generator rotor. The current typically is a direct current. The current travels from the exciter in a closed loop configuration along a conductive lead path 18 that travels through the generator rotor 16 to the rotor coil windings 17, and then back through another conductive lead path to the exciter.

An overview of an exemplary existing generator and generator lead path is provided, followed by a more detailed explanation of the lead path of the present invention, to include various component parts and methods of use. Referring to FIGS. 1 and 2, a generator 10 is coupled in axial alignment between a turbine (not shown) and an exciter (not shown). The exciter provides an electrical current to the generator rotor. The current typically is a direct current. The current travels from the exciter in a closed loop configuration along a conductive lead path 18 that travels through the generator rotor 16 to the rotor coil windings 17, and then back through another conductive lead path to the exciter.

The lead path 18 commonly comprises a plurality of discrete interconnected conductive components, rather than a single unitary component. There are a variety of reasons why a plurality of components are advantageously used. For example, generator components near the lead path 18 often cause a portion of the lead path 18 to take on a particular size or shape. For another example, generator components near the lead path 18 often cause the lead path 18 to be attached to the generator in a particular manner. For yet another example, the lead path 18 often experiences varying stress and load forces. For an additional example, generator fabrication and maintenance efforts can be hindered if the lead path 18 comprises a single long unitary component.

Figure 3:
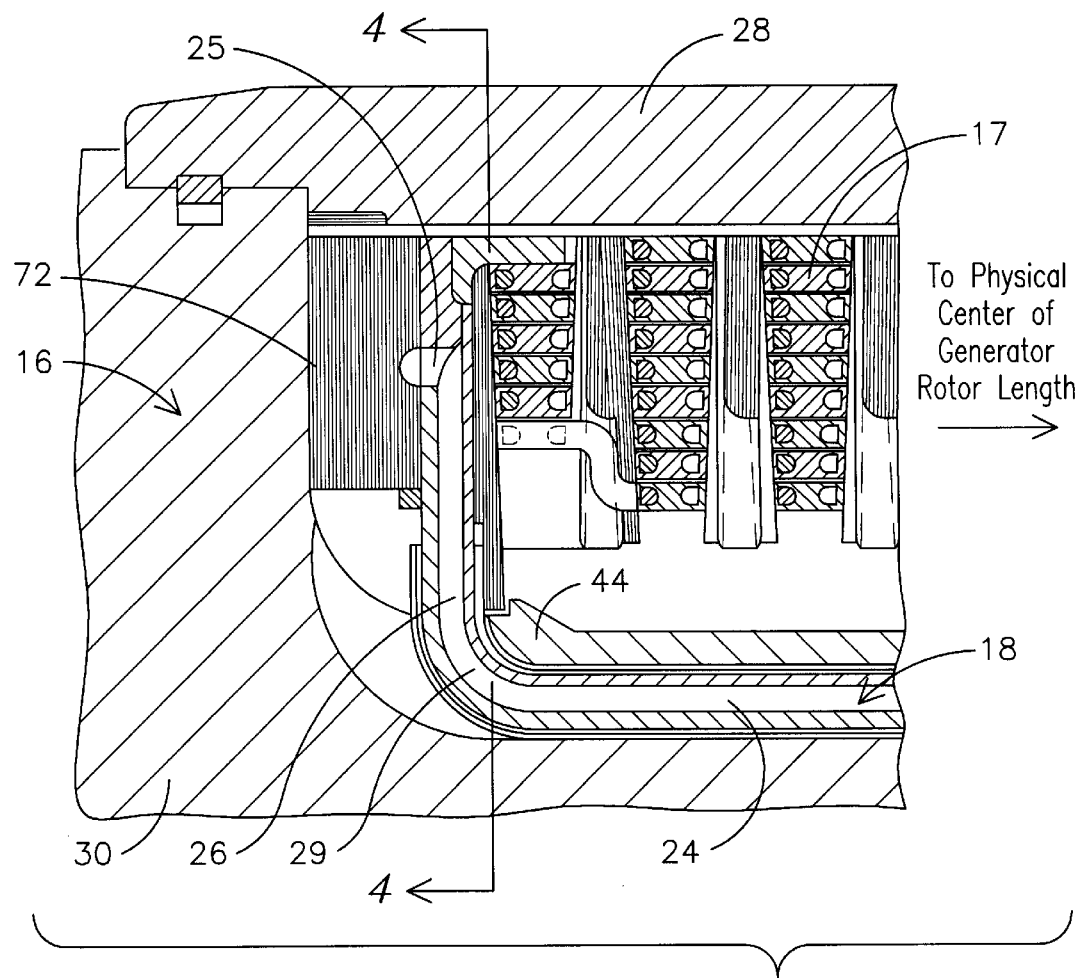
FIG. 3 is a detail view of FIG. 2, showing a portion of the lead path.
Figure 4:
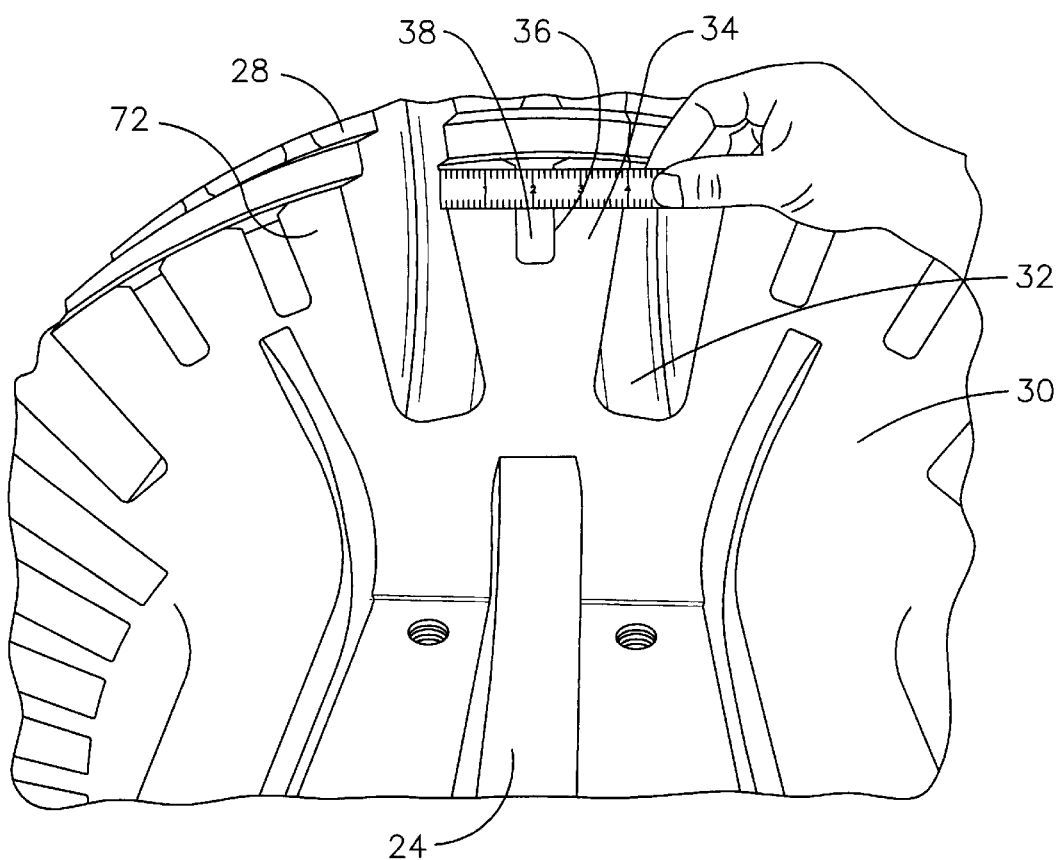
FIG. 4 is a cut view of an existing rotor shaft taken along cut-line 4—4 in FIG. 3.

FIGS. 2 and 3 show an exemplary existing lead path 18 comprising an axial lead 20 attached to a radial lead 22 and the radial lead 22, in turn, attached to a J-strap 24. The axial lead 20 physically and electrically connects with the exciter and the J-strap 24 physically and electrically connects with the coil windings 17. As the J-strap extends outboard, it is restrained in the rotor 16 by several shaft wedges 44. An end portion 26 of the J-strap 24 is freely suspended and centrifugally supported by a retaining ring 28 of the rotor 16. The end portion 26 is axially positioned between the coil windings 17 and the rotor shaft 30. Referring to FIG. 4, the rotor shaft 30 has a pair of ventilation scoops 32 positioned on opposing sides of a pole face centerline 34 (i.e. the portion of the rotor shaft 30 between the vent scoops 32), as well as a damper bar channel 36 holding a damper bar 38. The vent scoops 32 provide egress for a cooling medium (e.g. air, hydrogen) that cools the rotor 16 during generator operation, and the damper bar 38 draws eddy currents from the rotor shaft 30 during generator operation 10.

With the lead path 18 in this exemplary configuration, it has been observed that the lead path 18 tends to sever or otherwise fail near area A. It has been found that a variety of phenomenon may cause or tend to cause to the lead path to sever or otherwise fail near area A. One phenomenon involves radial expansion of the J-strap 24, which may be caused by radial expansion of the retaining ring 28 during generator start up and operation. Since the J-strap 24 is supported by the radially expanded retaining ring 28, the J-strap also radially expands. This radial expansion may cause or tend to cause various and varying stresses, and loads in or on the J-strap 24 or lead path 18. Another phenomenon involves axial movement or pivoting of the J-strap 24, which may be caused by thermal expansion of the coil windings 17 during generator start up and/or operation. Since the coil windings 17 have a higher thermal expansion rate than the rotor shaft 30 and are heated by the electric current, they axially expand faster and more than the rotor shaft 30 axially expands. This thermal expansion causes or tends to cause an outboard axial force on the J-strap 24, which is positioned between the coil windings 17 and the rotor shaft 30 and must pivot from the curved bottom portion 29 of the J-strap 24 to allow for the thermal expansion. This axial expansion may cause or tend to cause various and varying stresses, stress concentrations, and loads in or on the J-strap 24 or lead path 18. Moreover, the combination of the above-identified various and varying stresses, stress concentrations, loads and forces may exasperate lead path problems. These phenomenon may lead not only to J-strap 24 failure, but also to failure of the shaft wedges 44 or the rotor shaft 30. Moreover, the combination of one or more of the above-identified phenomenon may exasperate lead path failure during generator startup and operation.

Components of the Present Invention

Figure 5A:
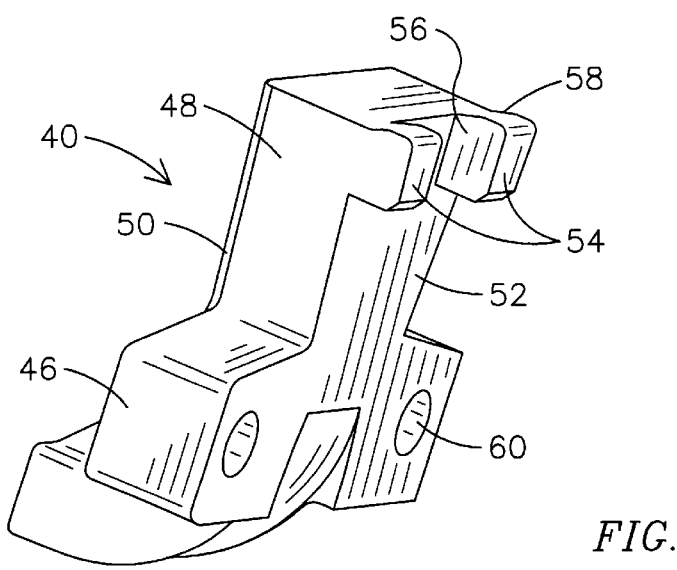
FIG. 5A is a perspective view of a cleat component of the present invention.
Figure 5B:
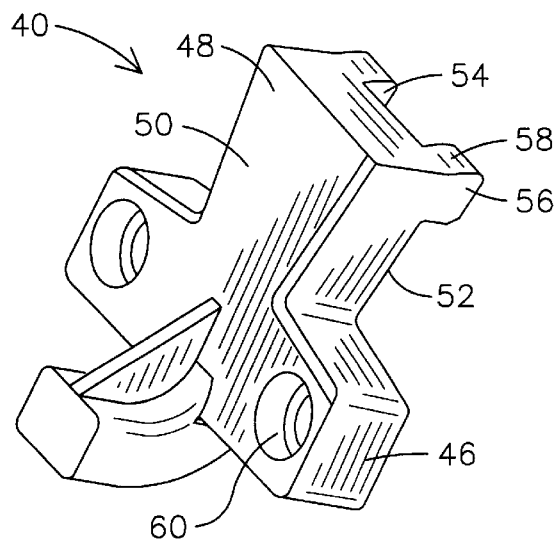
Fig. 5B is another perspective view of the cleat component of the present invention.
Figure 6:
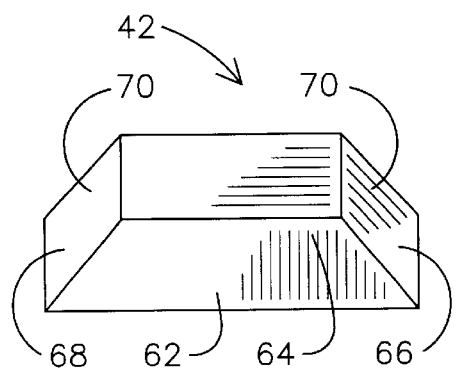
FIG. 6 is a perspective view of a wedge component of the present invention.
Figure 7:
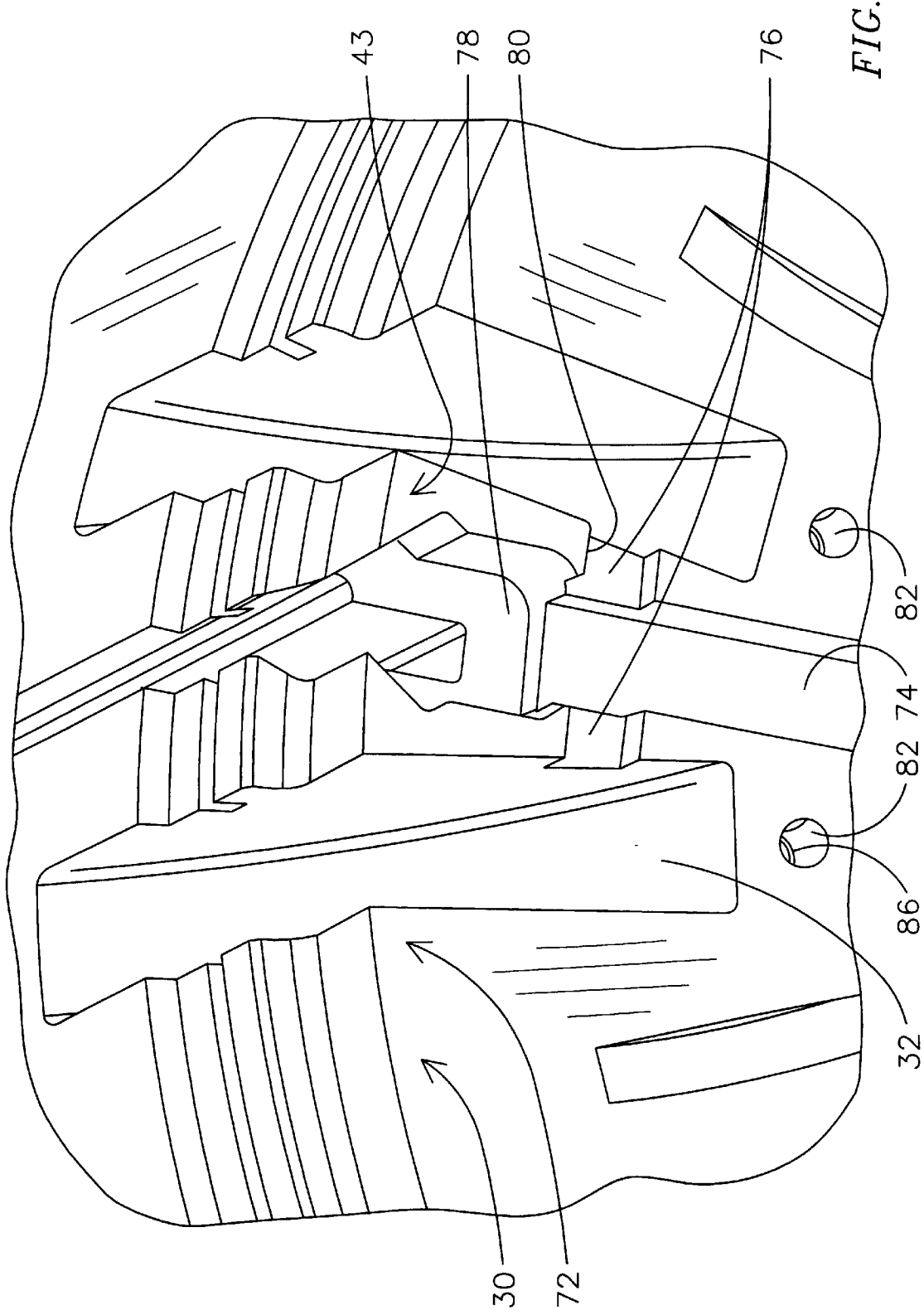
FIG. 7 is a schematic view of a modified rotor shaft taken around cut line 4—4 in FIG. 3.

FIGS. 5 and 6 show various components of the lead path 18 of the present invention and are described below. These components include a cleat component 40 and a wedge component 42. The present invention also advantageously uses a modified rotor shaft 43 (FIG. 7). The components are intended to address and withstand the varying and various stresses, stress concentrations, forces and loads that are exerted along the lead path 18, especially around area A shown in FIG. 2, during normal generator operation in order to inhibit, if not, prevent lead path failure.

FIGS. 5A & 5B show a cleat 40 of the present invention. The cleat 40 advantageously supports at least a portion of the radial load of the J-strap 24 during generator startup and operation, so that the radial load is no longer supported by the retaining ring 28. The cleat 40. also advantageously supports at least a portion of the axial load of the J-strap 24 during generator startup and operation, so that the axial load does not bend the J-strap 24. In addition to supporting at least a portion of the radial and at least a portion of the axial J-strap 24 loads, the cleat 40 advantageously is configured to adapt or fit within the physical confines of the generator shaft 30 with little, preferably minimal physical modification to the generator 10.

The illustrated cleat 40 has a generally T-shaped configuration with a first or radially inward end 46 and a second or radially outward end 48, as well as a first or outboard face 50 and a second or inboard face 52, although other geometries could be used (e.g. triangular-shaped, cross-shaped, diamond-shaped, polygonal-shaped, having a radial portion and an axial portion, curved, curvilinear, and the like). At least one spigot 54, preferably a plurality of spigots and most preferably 2 spigots, extend from the cleat 40 to support at least a portion of the radial load of the J-strap 24 and the weight of the cleat 40, and are adapted to be placed within spigot slot(s) 76 (described below). The exemplary embodiment shows two spigots 54 arranged on the radially inward end 48 of the inboard face 52 of the cleat 40, toward opposing edges of the cleat 40. An upper portion 56 of the spigot 54 is advantageously tapered 58 to assist in supporting the axial load of the J-strap 24. The taper 58 has a constant angle of about 2° to about 60°, preferably about 10° to about 45°. There is no requirement, however, that the taper 58 be formed as a single portion on the spigot 54 or have a uniformly linear angle. Rather the taper 58 could be formed as a plurality of tapered portions and/or have one or more portions with a multilinear, curved or curvilinear composition. The spigots 54 have an axial length of about 0.1 inch to about 3 inches and preferably about 0.5 inch to about 1 inch, and a radial length of about 0.1 inch to about 3 inches and preferably about 0.5 inch to about 1 inch.

The illustrated cleat 40 also has at least one bolt-hole 60, preferably a plurality of bolt-holes and most preferably 2 bolt-holes, arranged on the cleat 40 to provide a means for attaching the cleat 40 to the rotor shaft 30 (described below). The exemplary embodiment shows 2 bolt-holes 60 arranged on the radially inward end 46 of the cleat 40, toward opposing edges of the cleat 40. Each bolt-hole 60 has a circumference of about 0.1 inch to about 3 inches and preferably about 0.5 inches to about 1 inch, to allow a bolt to pass therethrough. If a plurality of bolt-holes 60 are used, they need not have the same diameter.

As will be understood by one skilled in the art, the cleat 40 can be configured in a variety of alternative ways. For example, instead of using at least one spigot 54 that extends away from the cleat 40, a groove could be made into the other portions of the cleat 40. For another example, other means for fastening the cleat 40 to the shaft 30 could be used, such as clamps, clips, adhesives, magnets, soldering, friction locks, brazing, other threaded or nonthreaded fasteners and the like.

The cleat 40 is constructed of a material having a suitable strength-to-weight ratio to withstand the varying and various stress, load and other forces supported by it during generator operation. Suitable materials include aluminum, titanium, magnesium, metal, alloys, fiberglass, composites and the like, as will be understood by one skilled in the art.

FIG. 6 shows a wedge component 42 of the present invention. The wedge 42 advantageously supports at least a portion of the radial load of the J-strap 24, to include at least a portion of the upper or hammerhead portion 25 of the J-strap 24 (FIG. 8), during generator startup and operation, rather than this radial load being supported by the retaining ring 28. In addition to supporting this radial load, the wedge 42 is advantageously configured to adapt or fit within the physical confines of the generator shaft 30 with little and preferably minimal physical modification to the generator 10.

The illustrated wedge 42 has a generally trapezoidal shaped configuration with a first or radially inward end 62 and a second or radially outward end 64, as well as a first and second sides 66, 68, although other geometries could be used to achieve the purpose of the wedge (e.g. oval, lipped, ledged). The lower end 62 of the wedge 42 has a length of about 1 inch to about 6 inches and preferably about 2 inches to about 3 inches. The upper end 64 of the wedge 42 has a length of about 0.5 inch to about 4 inches and preferably about 1.5 inches to about 2 inches. The radial height of the wedge 42 is about 0.25 inch to about 6 inches and preferably about 0.5 inches to about 2 inches. The sides 66, 68 of the wedge 42 have a taper 70 with a constant angle of about 5° to about 85°, preferably about 15° to about 45°. There is no requirement, however, that the taper 70 have a uniformly linear angle, and could alternatively have a multilinear, curved or curvilinear composition.

The wedge 42 is advantageously constructed of a material having a suitable strength to withstand the varying and various stress, load and other forces supported by it during generator operation. In general, suitable wedge 42 materials are as strong as, if not stronger, than suitable cleat 40 materials, since the wedge 42 is relatively smaller than the cleat 40 and tends to have to withstand greater stresses, loads and other forces than the cleat 40. Suitable materials include aluminum, titanium, magnesium, metal, alloys, fiberglass, composites and the like, as will be understood by one skilled in the art.

FIG. 7 shows a modified rotor shaft component 43 of the present invention. The modified rotor shaft 43 is advantageously modified by working a portion of the existing rotor shaft 30. The shaft 43 can be modified by machining the rotor body face 72 of the existing rotor shaft 30 to form a J-strap slot 74, at least one spigot slot 76, and a hammerhead pocket 78. The machining can be performed in any of a variety of ways, such by end milling the rotor body face 72, or otherwise cutting, filing, sanding portions of the rotor body face 72 and the like.

The J-strap slot 74, spigot slot(s) 76, and hammerhead pocket 78 are advantageously configured to assist the cleat 40 and wedge 42 in supporting the radial and axial loads of the J-strap 24. They are also advantageously configured to adapt or fit within the physical confines of the generator shaft 30 with little and preferably minimal physical modification to the existing generator 10 configuration. In particular, modification to the vent scoops 32, damper bar channel 36 and damper bar 38 is desirably minimized so as not to retract from the functions of these elements and to reduce costs. One way to accomplish this is by configuring the J-strap slot 74, spigot slot(s) 76, and hammerhead pocket 78 substantially around, away from, or not on these elements.

The J-strap slot 74 is machined radially into the pole face centerline 34 between the vent scoops 32. A thickness of about 0.1 inch to about 2 inches, and preferably about 0.5 inch and about 1.5 inch is left between the J-strap slot 74 and each of the vent scoops 32 for structural stability. This thickness may vary along the length of the J-strap slot 74 due to the varying thickness of the shaft 30 between the vent scoops 32. The J-strap slot 74 is sized and configured to accept and retain a portion of the J-strap 24, which can range from having a width of about 0.5 inches to about 5 and from having a depth of about 0.5 inches to about 4 inches.

The spigot slot(s) 76 are machined into the pole face centerline 34 between the vent scoops 32. Although the illustrated embodiment shows the 2 spigot slots 76 directly connecting with the J-strap slot 74 and the vent scoops 32, there is no requirement that they so connect. The spigot slots 76 are sized and configured to accept and retain the spigots 54 of the cleat 40 (described above). The spigot slots 76 have a corresponding taper 80 that cooperates with the taper 58 on the spigot 54 so that the spigots 54 can support at least a portion of the radial and axial loads of the J-strap 24 during generator start up and operation.

The hammerhead pocket 78 is machined into the pole face centerline 34 between the vent scoops 32. A thickness of about 0.1 inch to about 2 inches, and preferably about 0.5 inch and about 1.5 inch is left between the hammerhead pocket 78 and each of the vent scoops 32 for structural stability. This thickness may vary along the length of the hammerhead pocket 78 due to the varying thickness of the shaft 30 between the vent scoops. The hammerhead pocket 78 is sized and configured to accept and retain the wedge 42 (described above), as well as at least a portion of the hammerhead 25 which can range from having a width of about 0.5 inches to about 5 and from having a depth of about 1 inches to about 8 inches. This hammerhead pocket 78 configuration, however, requires that the damper bar 38 be axially shortened about 1 to about 10 inches to provide a suitable space for the wedge 42 and/or hammerhead 25.

The modified shaft 43 may also include one or more voids 82 that correspond with the one or more bolt-holes 60 in the cleat 40. At least a portion of the voids 82 are threaded to secure a bolt (not shown). Advantageously, the inboard end 86 of the void 82 is threaded, since that end is father away from the curvature in the vent scoop 32 than the other end of the void 82, which thus provides stronger structural support. The voids 82 have an axial depth of about 0.1 inch to. about 5 inches and preferably about 1 inches to about 2 inches.

The above-described components have been provided in terms of certain preferred and/or advantageous materials, dimensions, configurations, and connections (i.e. "specifications"). These specifications are provided with respect to the above-identified exemplary generator type. It will be understood by one skilled in the art that such disclosed specifications can be modified for use with other generators or apparatuses both presently known and later developed. It will also be understood by one skilled in the art that various specifications of one or more components can be interchanged and used with various specifications of one or more other components, consistent with the purposes of the present invention. It will be further understood by one skilled in the art that not all of the above-described components are required to provide the lead path of the present invention. For example, one or more components may be disregarded and other components modified or adapted to replace the disregarded component(s).

Assembly of the Present Invention

Figure 8:
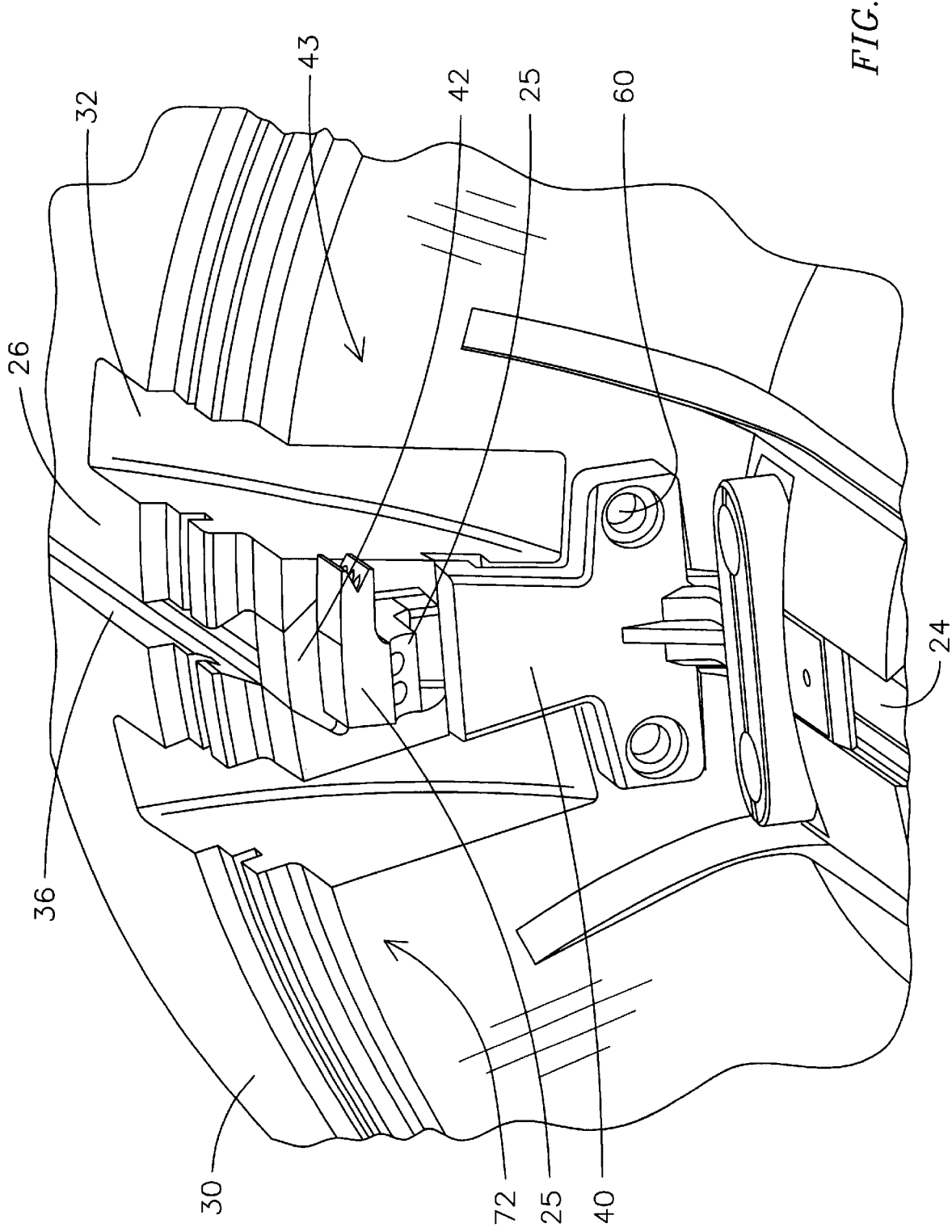
FIG. 8 is a schematic view similar to the view of FIG. 7, showing a portion of the modified lead path that uses lead path components shown in FIGS. 5 and 6.

FIG. 8 shows an exemplary assembly of the lead path 18 of the present invention. For ease of explanation and understanding only, and in no way to limit the scope of the invention, the exemplary lead path 18 assembly is provided without every consideration that may be found if the lead path 18 is assembled within a previously assembled generator.

The rotor body face 72 of the existing rotor shaft 30 is worked as explained above. The inboard end 26 of the J-strap 24 is extended toward the rotor body face 72 of the modified rotor shaft 43. At least a portion of the J-strap 24 is placed in the J-strap slot 74 and at least a portion of the hammerhead 25 is placed in the hammerhead pocket 78. The inboard face 52 of the cleat 40 is placed against the J-strap 24, with the tapered spigots 54 placed in the tapered spigot slots 76. The cleat 40 is attached to the modified rotor shaft 43 by bolts (not shown) that extend through the bolt-holes 60 of the cleat 40 and into the threaded voids 82 in the modified shaft 43. The wedge 42 is placed in the hammerhead pocket 78 above the hammerhead 25.

One result of the above-described exemplary assembly of components is the advantageous ability to provide a J-strap 24 that is radially supported by the rotor shaft via the cleat 40 and wedge 42, rather radially supported by the retaining ring 28. Radially supporting the J-strap 24 via the retaining ring 28 places or transfers varying and various stresses, forces and loads onto the lead path 18, and particularly onto the J-strap 24 portion of the lead path 18. It is believed that such a transfer causes or tends to cause lead path 18 failure. Thus, by providing a J-strap 24 that is radially supported by the rotor shaft rather than the retaining ring 28, a lesser amount of varying and various stresses, stress concentrations, forces and loads are transferred to the lead path 18, and in particular to the J-strap 24.

Another result of the above-described exemplary assembly of components is the advantageous ability to provide a lead path 18 that is axially supported by the rotor shaft via the cleat bolts 84 and the tapered spigot 54. Unsuitable axial support places or transfers varying and various stresses, stress concentrations, forces and loads onto the lead path 18, and particularly onto the J-strap 24 portions of the lead path 18. It is believed that such a transfer causes or tends to cause lead path 18 failure. Thus, by providing a lead path that is suitably axially supported by the rotor shaft, a lesser amount of varying and various stresses, stress concentrations, forces and loads are transferred to the lead path 18.

One way to provide a J-strap 24 that is radially and axially supported by the rotor shaft, is to place the J-strap 24 into a J-strap slot 74 and to place the hammerhead 25 into, a hammerhead pocket 78. Then, secure the so-positioned J-strap 24 with the cleat 40, wedge 42 and bolts. Such an arrangement and construction, among other things, allows at least a portion of the J-strap 24 to be radially supported by the tapered 58 spigot 54, and at least a portion of the hammerhead 25 to be radially supported by the wedge 42. Such an arrangement and construction, among other things, also allows the J-strap 24 to be axially supported by the tapered 58 spigot 54 and. bolts.

It will be understood by one skilled in the art that the present invention does not require that the above-described attachments be performed in any particular order, to include the above-described exemplary order. It will be also understood by one skilled in the art that the above-identified exemplary attachment techniques, as well as other attachment techniques known in the art, can be used to attach any one or more component to any other one or more component, and that any one or more component can be modified to use any one or more of these attachment techniques. It will be further understood by one skilled in the art that generator assembly or maintenance requirements may result in some or all of the above-described assembly steps to be interchanged, modified or even skipped. It will be still further understood by one skilled in the art that the disclosed components may be arranged in a variety of ways to provide a J-strap 24 that is radially and axially supported by the rotor shaft 30.

It will also be understood by one skilled in the art that the lead path 18 of the present invention is advantageously symmetrical about the pole face centerline 34, as well as symmetrical about each pole (e.g. within a 2 or 4 pole generator 10 configuration). A symmetrical design provides proper generator 10 balance.

Lead Path Retrofit

The above-described lead path components and assembly methods can also be used to retrofit an existing lead path of a generator. One way to perform such a retrofit is to place the J-strap 24 into a J-strap slot 74 that is machined into the existing shaft 30 and to place the hammerhead 25 into a hammerhead pocket 78 that is machined into the existing shaft 30. Then, secure the so-positioned J-strap 24 with the cleat 40, wedge 442 and bolts.

One result of the above-described exemplary retrofit is the advantageous ability to allow the J-strap 24 to be radially and axially supported by the rotor shaft. Not radially and axially supporting at least a portion of the J-strap 24 by the rotor shaft places or transfers varying and various stresses, forces and loads onto the lead path 18, and particularly onto the J-strap 24 portions of the lead path 18. It is believed that such a transfer causes or tends to cause lead path 18 failure. Thus, by providing a lead path 18, and more particularly a J-strap 24 portion of the lead path 18, that is radially and axially supported by the rotor shaft, a lesser amount of varying and various stresses, forces and loads are placed on the lead path 18.

Although this invention has been described in terms of a certain exemplary uses, preferred embodiment, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. An apparatus adapted to form a conductive path for carrying an electric current in a generator having a shaft, the apparatus comprising:

an electrically conductive strap having a first end and a second end, and forming at least a portion of the conductive path; and a cleat having a radially inward portion and a radially outward portion, wherein the radially inward portion is adapted to retain the strap between the cleat and a portion of the shaft, and the radially outward portion comprises a spigot extending axially from the radially outward portion to engage the shaft and to carry at least a portion of a radial load of the strap and at least a portion of an axial load of the strap.

2. The apparatus of claim 1, wherein the current travels in a closed loop from an exciter, through the rotor to a plurality of rotor coil windings and then back to the exciter.

3. The apparatus of claim 2, wherein the strap is generally J-shaped with first and second ends, one of the ends having a hammerhead portion that electrically connects to the rotor coil windings.

4. The apparatus of claim 1, wherein the cleat has a pair of spigots extending from opposing edges of the cleat.

5. An apparatus adapted to form a conductive path for carrying an electric current in a generator having a shaft, the apparatus comprising:

an electrically conductive strap having a first end and a second end, and forming at least a portion of the conductive path; and a cleat having at least one spigot, the cleat adapted to retain the strap between the cleat and a portion of the shaft, the spigot sized and configured to carry at least a portion of a radial load of the strap and at least a portion of an axial load of the strap;

wherein each of the spigots have a linear taper adapted to accept a portion of a radial load from strap and a portion of an axial load from the strap.

6. The apparatus of claim 5, wherein the shaft has a pair of slots sized and configured to retain the pair of spigots.

7. The apparatus of claim 1, wherein the cleat has at least one bolt-hole adapted to attach the cleat to the shaft by at least one bolt that fastens to the rotor.

8. The apparatus of claim 1, wherein the cleat is generally T-shaped and adapted to accept at least a portion of a radial load of the strap.

9. The apparatus of claim 8, wherein the cleat is generally T-shaped and adapted to accept at least a portion of an axial load of the strap.

10. An apparatus adapted to form a conductive path for carrying an electric current in a generator having a shaft, the apparatus comprising:

an electrically conductive strap having a first end and a second end, and forming at least a portion of the conductive path;

a cleat having at least one spigot, the cleat adapted to retain the strap between the cleat and a portion of the shaft, the spigot sized and configured to carry at least a portion of a radial load of the strap and at least a portion of an axial load of the strap; and a wedge having a generally trapezoidal shape and sized and configured to accept a least a portion of a radial load of the strap.

11. The apparatus of claim 10, wherein the wedge is sized and configured to accept at least a portion of an axial load of the strap.

12. The apparatus of claim 10, wherein the shaft is sized and configured to hold the wedge during generator operation.

13. The apparatus of claim 12, wherein the shaft has a slot sized and configured to accept at least a portion of the strap, and a pocket sized and configured to accept at least a portion of the hammerhead.

14. The apparatus of claim 1, wherein the cleat is constructed of a material having a relatively high strength-to-weight ratio.

15. The apparatus of claim 14, wherein the cleat is constructed of a metal.

* * * * *